UNITED STATES PATENT OFFICE.

SIDNEY H. KATZ AND FRANK K. OVITZ, OF PITTSBURGH, PENNSYLVANIA.

PROCESS FOR THE MANUFACTURE OF FORMATES.

1,212,359.   Specification of Letters Patent.   Patented Jan. 16, 1917.

No Drawing.   Application filed May 16, 1916. Serial No. 97,902.

*To all whom it may concern:*

Be it known that we, SIDNEY H. KATZ and FRANK K. OVITZ, citizens of the United States, residing at Pittsburgh, in the State of Pennsylvania, have jointly invented a certain new and useful Process for the Manufacture of Formates, of which the following is a specification.

Our invention relates generally to the already known method of making formates by synthesis from carbon monoxid and alkalis; its primary object being to speed up the reactions, which have heretofore been slow, and to render the process more efficient and the product more uniform and cheaper.

The development of this art has extended over a period of at least sixty years; (Bertholet; *Annales de Chemie et de Physique;* Series 3, vol. 46, page 477, 1856.) Bertholet, who first investigated the reaction of carbon monoxid with caustic alkalis, used caustic potash in a solid state, but moistened with water, subjecting it to the action of carbon monoxid at temperatures ranging up to 220 degrees centigrade. He appears to have attained an insignificant amount of absorption in a very long time. In other experiments he used a solution of potassium hydroxid in contact with the gas at ordinary temperatures. Ammonium formate was produced about 1895-6 by passing an ammonia vapor and carbon monoxid together through a heated vessel. Other chemists improved the process by use of super-atmospheric pressures, specifically using sodium hydroxid in pulverized form, and mixed with lime in order to make it more porous, so that the gas could come in more intimate contact for better reaction. Still others later used an aqueous solution of alkali in contact with carbon monoxid at both high pressure and high temperature. Thus in the prior art the processes included the use of reagents in a gaseous phase with reagents in a solid phase; or reagents in a gaseous phase with reagents in a liquid phase; or again, two reagents both in the gaseous phase. In each of these previous methods the reaction was slow and sluggish, and the object of the improvements have been to increase the speed of reaction.

One of our objects is to still further increase the speed and efficiency of the reaction, and we attain this object, generally speaking, by causing several reactions to take place simultaneously, and together; as between one pair of reagents of which one is in the liquid and the other in the gaseous phase, and another pair both in the gaseous phase, whereby each reaction seems to assist the other. For example, we pump a solution of sodium hydroxid having a specific gravity of about 1.35, and under pressure of say twelve atmospheres, through a pipe or other vessel heated in any convenient way to about 180 degrees centigrade, discharging it into the top of a vertical cylindrical vessel filled with a porous material, while in the bottom of the cylinder we simultaneously pump such a gas as producer gas containing carbon monoxid, mixed with about one per cent. of its volume of ammonia gas, these gases having been also heated to about 180 degrees centigrade.

The liquid trickling downward through the porous material in finely divided form, while the gases pass upward through the porous material and the divided liquid, effects an intimate admixture and contact. Ammonium formate is immediately produced, and comes into contact with the sodium hydroxid, resulting in a rapid reaction, which in effect is as follows:

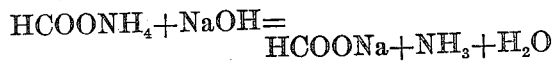
$$HCOONH_4 + NaOH = HCOONa + NH_3 + H_2O$$

The ammonia gas thus liberated may at once combine again to form ammonium formate; and thus the cycle of changes is repeated over and over as the gases pass upward through the liquid, the counter-current between the carbon monoxid gas and the dissolved sodium hydroxid and also between the ammonia gas, water vapor, and carbon monoxid, effecting a very rapid and efficient production of formates.

At the top of the cylinder we may take out and collect the escaping gas, recover the ammonia for use over again, while at the bottom of the cylinder we may continuously draw off sodium formates.

It will be understood of course that other apparatus, and other reagents, may be used; for example, we may use potassium hydroxid instead of sodium hydroxid, and in place of ammonia we may use pyridin, or any other volatile alkaline material. The advantages of our invention flow largely from using the extra gas as an interchanger in the process, thus speeding up all of the reactions and rendering the process more efficient, and cheapening the product.

Having thus described our invention, and illustrated its use, what we claim is the following:

1. The process of making formates by reaction of carbon monoxid with a caustic alkali, including the admixture with these reagents of a volatile alkali to act as an interchanger, substantially as described.

2. The process of making formates by bringing carbon monoxid in a gaseous state into intimate contact with an alkali hydroxid in solution, and simultaneously exposing both to a volatile alkali in the gaseous phase.

3. The process of making formates which comprises passing a current of gas containing carbon monoxid and ammonia against a counter-flowing divided stream of sodium hydroxid solution.

4. The process of making formates by passing downward through a closed vessel under pressure of from 10 to 20 atmospheres, a solution of sodium hydroxid in a divided state, and simultaneously passing upward therethrough a gas containing carbon monoxid and a gas containing ammonia.

5. The process of making formates by passing downward through a closed vessel under pressure of from 10 to 20 atmospheres, a solution of sodium hydroxid in a divided state, and simultaneously passing upward therethrough a gas containing carbon monoxid and a gas containing ammonia, meantime keeping said reagents at a temperature of 150 to 220 degrees centigrade.

In testimony whereof we have hereunder signed our names.

SIDNEY H. KATZ.
FRANK K. OVITZ.